Figure 1:
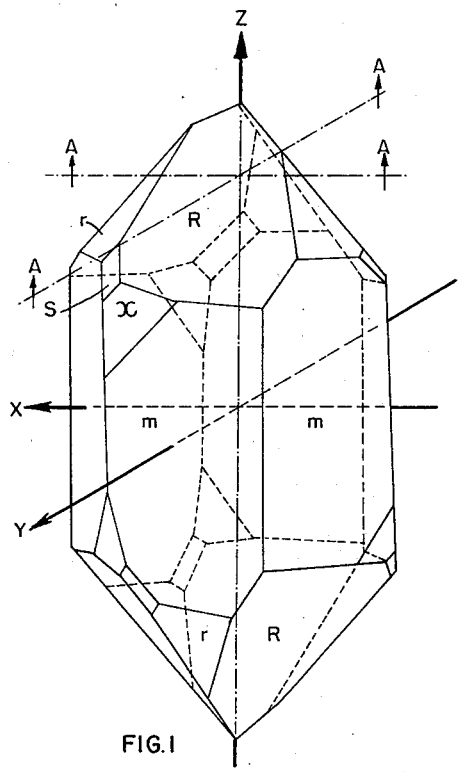

April 18, 1950     N. A. WOOSTER ET AL     2,504,368
QUARTZ CRYSTAL AND METHOD OF TREATING SAME Filed Feb. 12, 1947     4 Sheets-Sheet 1

*INVENTORS.*
NORA A. WOOSTER
WILLIAM A. WOOSTER
EDWARD A. FIELDING
BY
ATTORNEY

April 18, 1950  N. A. WOOSTER ET AL  2,504,368
QUARTZ CRYSTAL AND METHOD OF TREATING SAME
Filed Feb. 12, 1947  4 Sheets-Sheet 3
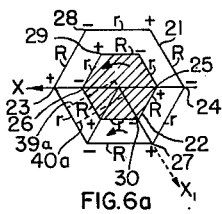
FIG.6a
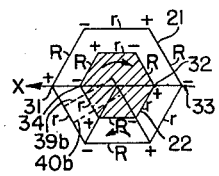
FIG.6b
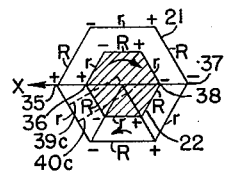
FIG.6c
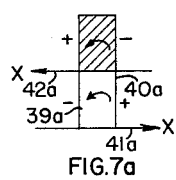
FIG.7a
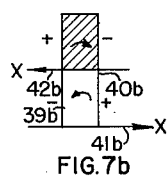
FIG.7b
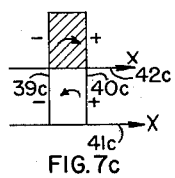
FIG.7c
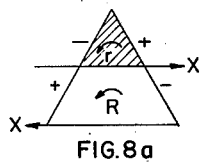
FIG.8a
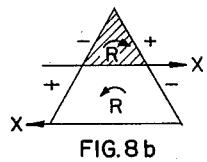
FIG.8b
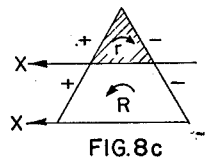
FIG.8c
| | | $\phi$ | $\theta$ | $\psi$ |
|---|---|---|---|---|
| FIG.9a | 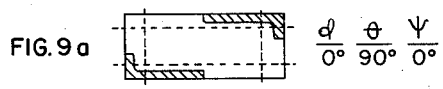 | 0° | 90° | 0° |
| FIG.9b | 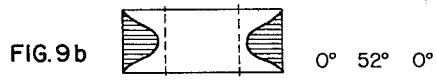 | 0° | 52° | 0° |
| FIG.9c | 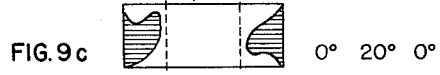 | 0° | 20° | 0° |
| FIG.9d |  | 30° | 90° | 0° |
| FIG.9e |  | 30° | 60° | 0° |
| FIG.9f |  | 0° | 0° | 0° |
| FIG.9g | 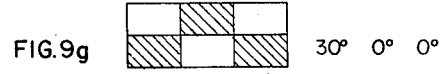 | 30° | 0° | 0° |
*INVENTORS.*
NORA A. WOOSTER
WILLIAM A. WOOSTER
BY EDWARD A. FIELDING
*ATTORNEY*

April 18, 1950     N. A. WOOSTER ET AL     2,504,368
QUARTZ CRYSTAL AND METHOD OF TREATING SAME
Filed Feb. 12, 1947     4 Sheets-Sheet 4
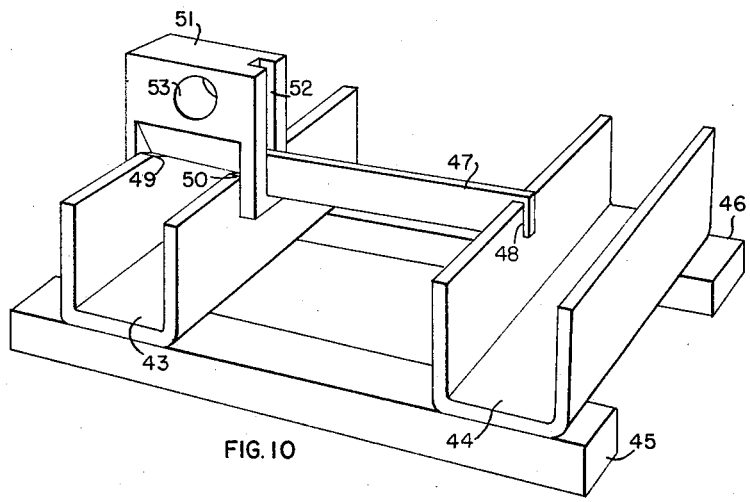
FIG.10
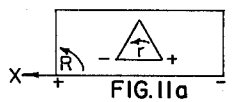 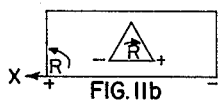 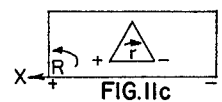
FIG.11a    FIG.11b    FIG.11c
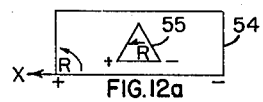 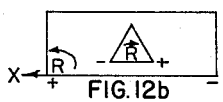 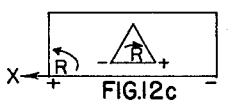
FIG.12a    FIG.12b    FIG.12c
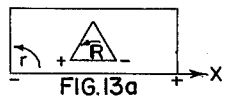 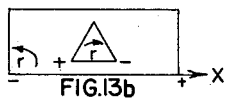 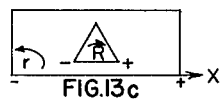
FIG.13a    FIG.13b    FIG.13c
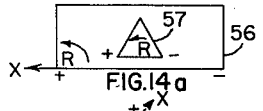 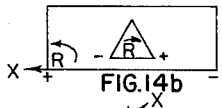 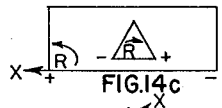
FIG.14a    FIG.14b    FIG.14c
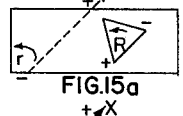 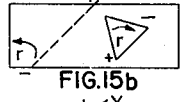 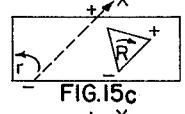
FIG.15a    FIG.15b    FIG.15c
 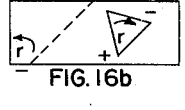 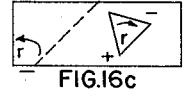
FIG.16a    FIG.16b    FIG.16c
*INVENTORS.*
NORA A. WOOSTER
WILLIAM A. WOOSTER
BY    EDWARD A. FIELDING
*Harry B. Sage*
ATTORNEY Patented Apr. 18, 1950

2,504,368

UNITED STATES PATENT OFFICE 2,504,368

QUARTZ CRYSTAL AND METHOD OF TREATING SAME

Nora Anna Wooster and William Alfred Wooster, Cambridge, and Edward Armitage Fielding, Birch, England, assignors to The General Electric Company, Limited, London, England Application February 12, 1947, Serial No. 728,030
In Great Britain September 14, 1943

Section 1, Public Law 690, August 8, 1946
Patent expires September 14, 1963

13 Claims. (Cl. 171—327)

1

This invention relates to methods of treating quartz crystals, which manifest twinning of the type known as electrical twinning, and to the quartz crystals produced by such methods. The word "crystal," as used herein with reference to the treatment in accordance with the invention, refers to untreated or treated portions containing only part of the structure of an ideal or completely developed crystal. These portions of a crystal may take the forms of plates, bars, or the like such as are used as piezoelectric elements, for example, elements of the type used to control the frequency of an oscillator. Although a crystal which exhibits twinning actually includes two or more crystalline units separated by boundaries and having the related crystallographic structures peculiar to twinning, the twinned structure will be referred to as a crystal.

Hitherto the usual treatment of raw quartz crystals, such as natural quartz, included merely optical determination of the crystal structure and cutting and trimming to obtain flawless portions having the desired size and orientation with respect to the crystallographic axes. It is known, however, that quartz, otherwise of good quality, may be unsatisfactory for the manufacture of piezoelectric elements because of twinning. Twinning may be of two kinds, optical and electrical, and a twinned crystal may show either form of twinning separately, or both forms of twinning may co-exist simultaneously. The presence of twinning leads to waste and expense in the manufacture of quartz crystals, since, out of a given batch of quartz, an appreciable proportion may have to be discarded as unsuitable.

Accordingly, an object of this invention is to provide a new and improved method of treating quartz crystals which substantially avoids one or more of the limitations of the described prior art treatment.

It is a further object of the invention to remove, or to reduce the extent of, electrical twinning in quartz crystals so as to reduce the amounts of unusable quartz hitherto wasted due to the defects attributable to electrical twinning.

It is also an object of this invention to provide new and improved quartz crystals having a modified pattern of electrical twinning.

In accordance with the invention, a method of treating a quartz crystal comprises heating the crystal and thereafter cooling the crystal while the crystal is strained to modify the pattern of the electrical twinning. In accordance with one feature of the invention, a quartz crystal which manifests electrical twinning is treated

2 to produce a modification of the pattern of twinning which serves to reduce the proportion of the volume of the crystal which is electrically twinned.

In accordance with a preferred embodiment of the invention, the method comprises heating the crystal to a temperature appreciably above its alpha-beta inversion temperature to convert it to the beta form, and thereafter cooling the crystal through its inversion temperature while the crystal is strained. It will be understood by those skilled in the art that, if a quartz piezoelectric crystal is heated to a temperature appreciably above the equilibrium temperature of inversion between the alpha ($\alpha$) and beta ($\beta$) phases, and this temperature is maintained for a sufficient time to permit equilibrium conditions to be established or approached, all parts of the crystal may be converted to the beta form. The inversion temperature is about 573° C.

For a better understanding of the present invention, together with other and further objects thereof, reference is had to the following description taken in connection with the accompanying drawings, and its scope will be pointed out in the appended claims.

Figure 2:
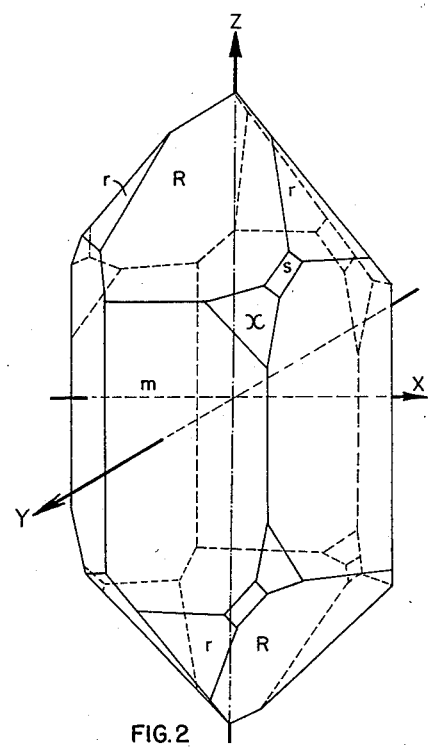
Figure 3:
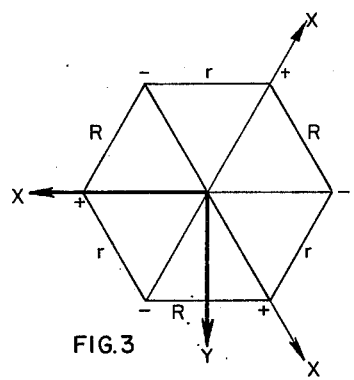
Figure 4:
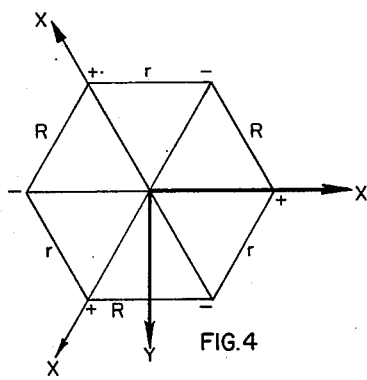

In the drawings, Figs. 1 and 2 are perspective views of respectively left-handed and right-handed crystals in a fully developed condition; Figs. 3 and 4 are horizontal sectional views taken through central portions of the crystals of Figs. 1 and 2 respectively; Figs 5a, 5b, 5c, and 5d are diagrams illustrating the configuration of the co-ordinate axes used conventionally in describing crystal sections cut from crystals of the type shown in Fig. 1; Figs. 6a, 6b, and 6c are sectional views taken at the plane AA of Fig. 1 and illustrating various types of twinning which may occur; Figs. 7a, 7b, 7c, 8a, 8b, and 8c are views of sections cut from the crystal of Fig. 1, assuming twinning therein of the types illustrated in Figs. 6a, 6b, and 6c, respectively, and illustrating the corresponding twinning effects occurring in such sections; Fig. 9 comprises seven views, designated a—g, representing diagrammatically the structure of treated crystals cut with faces having seven different orientations with respect to their crystallographic axes; Fig. 10 is a perspective view of apparatus used in carrying out one embodiment of the treatment in accordance with the invention; and Figs. 11, 12, 13, 14, 15, and 16, each of which includes three views designated a, b, and c, are simplified representations of portions of crystals manifesting twinning and include representations of such portions before and after treatments of the type described herein.

Treatment of the kind here proposed is not invariably successful, for crystals of certain cuts are more difficult to treat than others, and the precise circumstances of the treatment must to some extent be determined by trial on a specimen of the quartz which it is desired to treat. But, since some of the more important commercial cuts, including the AT, BT, and CT cuts, are among those which can comparatively readily be treated, economy in large scale manufacture can be achieved by intelligent use of the invention. More than one method of producing the required strain may be employed, for it may be produced either by imposing a temperature gradient on the quartz, or by the direct application thereto of a mechanical stress such as a torsional couple, or by a combination of temperature gradient and mechanical stress.

In order that the circumstances may be set out adequately, it will be convenient to give in detail a suitable set of co-ordinates for specifying the configuration of a sample cut from a crystal, in relation to the crystal from which it is cut, and also to describe in rather greater detail the phenomena of twinning and the improvements which may be produced by treatment in accordance with the invention.

It is well known that from the optical point of view alpha-quartz may be of two forms, one form showing a left-handed rotation, when looking toward the light source, of the plane of polarized light passed through the crystal in the direction of the optical axis, and the other form showing right-handed rotation. These forms will herein be referred to as left-handed and right-handed forms of quartz, respectively. The optical axis will be taken as the Z-axis of a set of orthogonal axes, and the X-axis of the set will be chosen at right angles to the Z-axis and in the direction of one of the electric axes of the crystal. The positive direction of the X-axis is so chosen that, if a compressional stress be applied to the ends of that axis, a positive charge is developed at the positive end of the axis and a negative charge at the negative end of the axis. The Y-axis is taken at right angles to the Z- and X-axes, the positive direction of the Y-axis being chosen in a manner to be described in connection with the drawings.

The conventions regarding the positive direction of the Y-axis will be readily understood with reference to Figs. 1 and 2 of the accompanying drawings, in which Fig. 1 is a view of an ideal left-handed crystal, while Fig. 2 is a view of an ideal right-handed crystal, the arrangement of the X-, Y-, and Z-axes in each case being shown. The positive direction of the Y-axis relative to the positive directions of the other two axes is chosen in the case of the left-handed crystal of Fig. 1 to form what may be called a right-handed set of axes. Conversely the positive direction of the Y-axis in the case of the right-handed crystal of Fig. 2 is chosen to form what may be called a left-handed set of axes. Figs. 3 and 4 show sections in the plane Z=0 through the crystals of Figs. 1 and 2 respectively, the signs of the charges produced by compression along the X-axis being indicated in each case. Owing to the trigonal symmetry of alpha-quartz it is immaterial which of the three symmetrical electric axes is taken as the X-direction. The fact that the sections are not regular hexagons has been ignored as it is immaterial to the discussion. It will be seen that the Y-axis coincides with one of the so-called mechanical axes of the crystal, which has electrical and mechanical axes as well as the optical crystallographic axis.

Figure 5A:
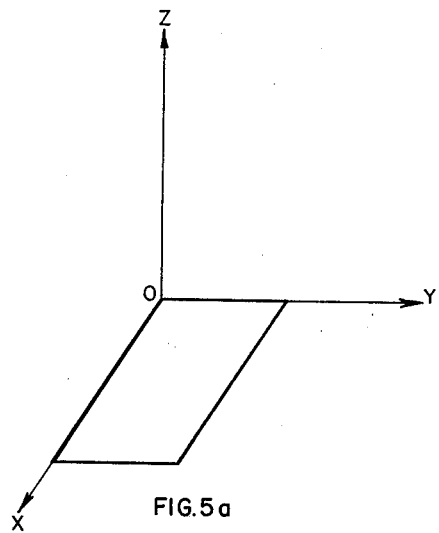
Figure 5B:
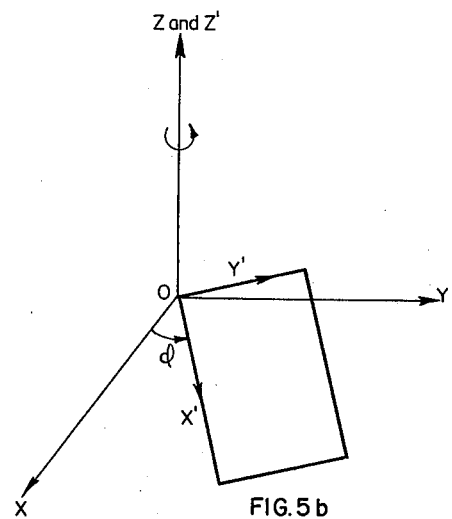
Figure 5C:
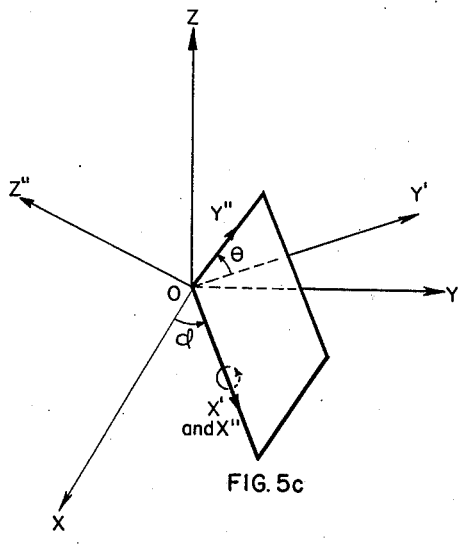
Figure 5D:
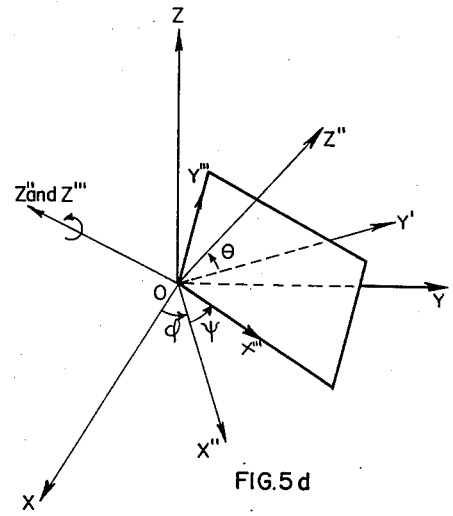

The method used for specifying the position, relative to the X-, Y-, and Z-axes, of a small rectangular quartz plate cut from the left-handed crystal of Fig. 1 is shown in Figs. 5a, 5b, 5c, and 5d. Suppose that the plate is actually cut in the position indicated in Fig. 5d. Its position is conveniently specified by giving the successive rotations which an imaginary rectangle originally lying in the X—Y plane with its longest dimension or length parallel to the X-axis, as shown in Fig. 5a, would have to undergo in order that it might be brought into coincidence with the central plane of the plate. These rotations are as follows: first, a rotation about the Z-axis through an angle $\phi$ so that the axes OX, OY of Fig. 5a are brought into the position shown in Fig. 5b, where the new positions of OX and OY are indicated by OX′, OY′—for symmetry, the position of OZ, although unchanged, is labelled OZ′; then a rotation through an angle $\theta$ about OX′, so that OY′ and OZ′ are carried into the positions OY″ and OZ″ shown in Fig. 5c—again, for symmetry, the position of OX′, although unchanged, is labelled OX″ in Fig. 5c; and finally a rotation about the axis OZ″ through an angle $\psi$, so that OX″ and OY″ are carried to the positions OX″ and OY″ of Fig. 5d.

It is noted that each of the rotations should be made in the indicated sense and, in the case of $\theta$ and $\psi$, each may be of any magnitude from 0° to 180°. In the case of $\phi$, however, because of the trigonal symmetry, the X-axis is always chosen to coincide with that one of the three electrical axes which is such that the magnitude of the required $\phi$-rotation is not greater than 60°.

In the case of a right-handed crystal, the procedure follows a corresponding course of rotation of the imaginary rectangle through an angle $\phi$ about OZ, rotation through an angle $\theta$ about the OX′ axis so produced, and then rotation through an angle $\psi$ about the OZ″ axis so produced, but in this case each rotation is made in the opposite sense, so that, just as in the case illustrated in Figs. 5a, 5b, 5c, and 5d, a positive angle $\phi$, for example, corresponds to a rotation about OZ in a sense which carries OX toward the instant position of OY.

The nature of the defects which arise from the various possible forms of twinning will now be explained with reference to Figs. 6a, 6b, 6c, 7a, 7b, 7c, 8a, 8b, and 8c of the accompanying drawings.

Let it now be supposed that, in Fig. 1, the material of the crystal within a central core thereof is twinned. Figs. 6a, 6b, and 6c show by the outline 21 the section of the surface of the crystal in the plane AA of Fig. 1, and also show by the outline 22 the section of this core of the crystal in the plane AA. In Figs. 6a, 6b, and 6c, the fact that the crystal sections in the plane AA are not regular hexagons has again been ignored, and the outlines 21 and 22 have been drawn as though the hexagons were regular. Owing to the nature of the structure of quartz, the arrangements of the atoms in the faces indicated by the reference letters R and r in Fig. 1 differ from one another, and the same reference letters are used in Figs. 6a, 6b, and 6c to indicate the corresponding faces. The area of the twinned portion of the crystal in the plane of the section 21 is indicated by shading in the region 22 of each of these figures, and the senses of the optical activity of the corresponding parts of the crystal are indicated by curved arrows.

Fig. 6a relates to the case where there is electrical twinning, but where there is no optical twinning, as will be seen from the senses of the curved arrows. The result is that, if the crystal is compressed in the direction of the X-axis, positive and negative charges are developed as shown at the points 23 and 24 of the outer portion and at the points 25 and 26 of the inner twinned portion. It will be observed that, because of the electrical twinning, the charges developed on the twinned portion are of polarity opposite to that of the charges developed on the outer portion. As has already been remarked, any of the other electrical axes of symmetry might be taken as the X-axis, and if the crystal were compressed along one of those axes, for example the axis $X_1$ shown dotted in Fig. 6a, charges would develop on that axis as shown at 27, 28, 29, and 30. It will be noted also that, where there is electrical twinning, the $r$ faces on the twinned portion are parallel to the R faces on the main body of the crystal, and vice versa.

Fig. 6b relates to the case where there is optical twinning, as indicated by the opposed senses of the curved arrows, but no electrical twinning. It will be seen that the R faces on the twinned portion are now parallel to the R faces on the main body of the crystal, and two $r$ faces are likewise parallel. In this case, compression along the X-axis shown produces positive charges at the points 31 and 32 and negative charges at the points 33 and 34. Compression along either of the other possible directions for an X-axis produces corresponding charges at the appropriate points on the axis chosen. Fig. 6b, as well as Figs. 6a and 6c, indicates the signs of all the charges that may be produced, though it will be appreciated by those skilled in the art that not all the charges are produced simultaneously by pressure along a single electrical axis. As in the case illustrated in Fig. 6a, the charges developed on the inner twinned portion are polarized oppositely to those developed on the outer portion.

Finally, Fig. 6c shows a case where there is compound optical twinning, i. e., both optical twinning, as indicated by the opposed senses of the curved arrows, and electrical twinning. In this case, which is comparatively rare, an $r$ face on the twinned portion is parallel to an R face on the main body of the crystal, and vice versa. Compression along an electrical axis X, of which one only is shown, produces positive charges at the points 35 and 36 and negative charges at the points 37 and 38.

The types of defects resulting from the various forms of twinning will be apparent from the foregoing description. They will be exemplified by the examples given in Figs. 7a, 7b, and 7c and in Figs. 8a, 8b, and 8c.

Figs. 7a, 7b, and 7c show sections, in a plane perpendicular to the Z-axis, of thin slices of crystal cut from the crystals to which Figs. 6a, 6b, and 6c, respectively, relate. The slices are to be understood to have been cut from the original crystals so as to be bounded by the two planes perpendicular to the plane of the paper indicated by the dotted lines 39a and 40a, 39b and 40b, and 39c and 40c in Figs. 6a, 6b, and 6c, respectively. Such slices have their faces normal to one of the X-axes, e. g., the axis $X_1$ in Fig. 6a; the positive direction of this X-axis for the main body of the crystal is indicated by the arrows marked 41a, 41b, and 41c, respectively, while the positive direction of the X-axis for the twinned portions, again shown shaded, is indicated by the arrows marked 42a, 42b, and 42c, respectively. For these slices the angles $\phi$, $\theta$, and $\psi$ are 30°, 90°, and 0°, respectively.

It will be clear from the description already given that, if the slice shown in Fig. 7a undergoes uniform compression in the X-direction of the lower part of the slice, the left-hand face of the lower part develops a negative charge while the right-hand face develops a positive charge, as illustrated. The opposite is the case with the upper twinned part, the right-hand face becoming negative and the left-hand face positive, as indicated in the drawing. Such a slice is unsuitable for use as a piezoelectric element.

Again, if the slice whose cross section is shown in Fig. 7b is compressed in the direction of the X-axis of the lower part of the slice, a negative charge develops on the left-hand face of the lower part and a positive charge on the right-hand face, while a positive charge develops on the left-hand face of the twinned upper part and a negative charge on the right-hand face, as illustrated. Such a slice similarly is unsuitable for use as a piezoelectric element.

Finally, if the slice whose cross section is shown in Fig. 7c is compressed in the direction of the X-axis, the signs of the charges developed on the faces of the twinned and untwinned parts of the crystal will be the same, as illustrated. Such a plate, however, in general shows defects due to its elastic inhomogeneity. It is only in cases in which a pure longitudinal vibration is excited in a direction parallel to the length or the thickness of the plate, that vibration not being coupled to any other mode of vibration, that effects due to the lack of homogeneity do not manifest themselves. Such deleterious effects arise if shear vibrations are produced or are desired, as is very often the case.

Figs. 8a, 8b, and 8c illustrate the corresponding phenomena for slices cut from crystals having twinned cores, similar to those represented respectively by Figs. 6a, 6b, and 6c along planes parallel to an R face of the main crystal. Figs. 8a, 8b, and 8c represent the faces of triangular slices cut from the crystal of Fig. 1, assuming it to have a twinned central core as shown in the respective Figs. 6a, 6b, and 6c. These slices may be taken to have faces parallel to the upper face R of the crystal of Fig. 1. Before cutting, the lower edge of each of the slices illustrated lay in the large crystals face $m$ below the face R, while the apex of the slice was located on the Z-axis of the crystal. The projections of these triangular slices on the horizontal sections of Figs. 6a, 6b, and 6c are shown in the respective figures. Of course, smaller plates of desired shapes may be cut from the triangular slices illustrated. It is thought that it will not be necessary to set out the description in further detail, but the signs of the charges developed when the respective slices are compressed in the direction of the X-axis of the main portion of the crystal are again shown, and the discrepancy between the signs of the charges developed on the edges of the two parts of the crystal slices shown in Figs. 8a and 8b are again apparent. Likewise, in the case of the slice represented in Fig. 8c, there is again difficulty because of discrepancy between the elastic properties of the two parts of the crystal, despite the fact that there is no longer a discrepancy in the signs of the charges.

In the foregoing description, it has been assumed for simplicity that the boundaries between the main portion of the crystal and the twinned portion are plane surfaces. In quartz crystals as found in nature this is not generally the case, the boundaries frequently being curved. When a slice is cut from a crystal which shows twinning, part of the slice will consist of material having the same structure as the main body of the crystal, and part, which may be in the form of a patch or patches bounded by the remainder, will have the twinned structure. By the treatment in accordance with the invention, the proportion of the plate which is occupied by the electrically twinned material can frequently be reduced or may even be removed entirely, or the electrically twinned part may be localized so that smaller plates free from twinning can be cut from the plate. As far as we are aware, the treatment does not change the sense of the optical activity in any part of the crystal.

When quartz is raised to a temperature appreciably above the alpha-beta inversion temperature, it is converted from alpha-quartz to the form of beta-quartz, there being a rearrangement of the atoms composing the quartz such that while the alpha-quartz possessed trigonal symmetry, as previously mentioned, the beta-quartz possesses hexagonal symmetry. The material has, in fact, undergone a polymorphic change. If the material is then allowed to cool down through the inversion temperature, it returns to the alpha form, the reverse polymorphic change having then taken place. If, during the process of raising its temperature above the inversion temperature and lowering it again slowly below that temperature, no, or but little, strain is imposed on a quartz crystal which shows electrical twinning, the state of twinning of the crystal may undergo some change but the change is apparently random in its nature and no effective reduction in the amount of twinning will result on the average, nor will any stable pattern of twinning be attained. However, using the method of treatment in accordance with the present invention, comprising heating a crystal which manifests electrical twinning, with or without optical twinning present in the same crystal, while the crystal is strained, there results a reversal of the positive directions of the electrical axes of at least a portion of the crystal, whereby the pattern of the electrical twinning is modified and in most cases the proportion of the volume of the crystal which is electrically twinned is reduced. Thus quartz crystals are produced which manifest electrical twinning in which the pattern of twinning has been modified by the treatment described, and preferably crystals are produced in which the proportion of the crystal volume which manifests electrical twinning has been reduced by the treatment described.

In estimating what proportion of the volume of the crystal is electrically twinned at any stage of treatment, it is to be understood that that proportion is to be measured by the ratio of the volume of that part of the crystal which is of one electrical polarity to the volume which is of the other polarity, the larger volume being chosen as the denominator of the ratio. Thus, for example, it may be that, before treatment, the state of the major part of the volume of the crystal is such that, when compressed in the direction of its thickness, the majority of one face of the crystal develops a positive charge while the majority of the opposite face develops a negative charge. The majority of the volume of the crystal then has the polarity corresponding to the charge development just stated, which may be called "Polarity A," the remainder of the crystal being of the opposite polarity. After treatment the greater part of the above-mentioned majority of the volume of the crystal may have changed to the opposite polarity, which may be called "Polarity B," giving the opposite charge development, so that it is now of the same polarity as was the minority of the volume of the crystal before treatment. Then, in estimating the said proportion in the manner aforesaid, the proportion before treatment will be the ratio of the volume possessing polarity B to the volume possessing polarity A, while, after treatment, the proportion will be the ratio of the volume possessing polarity A to the volume possessing polarity B.

The requisite strain in the crystal may be produced either by maintaining a suitable temperature gradient in it during cooling or by imposing the strain mechanically, and in order that the reduction in the said porportion may be as great as the circumstances permit, it is undesirable that the strain in the crystal should reverse its direction, or sign, within the volume which is required to be affected by the treatment. For this reason changes of sign of the temperature gradient in the crystal should be avoided as far as possible if the strain is produced thermally. Similarly, if it is desired to produce the strain mechanically, it is generally undesirable to do so by bending the crystal, since this results in a change of the sign of the strain as the neutral axis of bending is crossed, and there is a region in the neighborhood of the neutral axis where the stresses are low and the desired changes may not be produced. Such flexure, however, may sometimes be used, if desired, in cases where the user is prepared to cut a smaller crystal from the crystal which has been treated and to discard the remaining material. The preferred method of imposing mechanical strain is to apply a torque in a plane perpendicular to the longest or longitudinal direction of the crystal bar or plate to be treated, and it will be observed that this produces a strain which is of constant sign throughout the crystal except, perhaps, in the neighborhood of the points at which the torque is applied to the plate. Where a torque is applied, our experience has been that the existence of a temperature gradient of the order of 1° C. to 2° C. per cm. in the crystal is generally disadvantageous, and it is advisable as a practical matter to ensure that the temperature of the crystal is as nearly uniform from point to point of the crystal as can conveniently be secured, even though specimens of quartz occasionally are found in the treatment of which a small temperature gradient along the direction perpendicular to the plane in which the torque is applied appears to be advantageous.

It has already been stated that treatment of the kind here proposed is not invariably successful. Success depends, inter alia, on the cut adopted for the crystal plate. It is to be understood in connection with the claims hereinafter set out that treatment by an applied torque only of plates so cut that $\theta$ is substantially 0° or 90°, or so that $\varphi$ is substantially 30°, is excluded from their scope, since plates of such cuts cannot be effectively treated by the application of a torque. The change produced by treatment in accordance with the invention to decrease the proportion of the volume which is electrically twinned may conveniently be called "untwinning" for the sake of brevity. Moreover, only a small proportion of cases of successful treatment is to be expected unless the quartz is substantially pure and is free from inclusions or other mechanical defects, such as veil and bubbles, for example. Nevertheless, piezo-electric crystals normally are made of a substantially pure quartz, such as Brazilian quartz, which is free from flaws, so that this does not form any serious limitation on the commercial usefulness of the invention.

It will be appreciated that the precise amount of strain which must be imposed depends both upon the individual sample which it is desired to treat and upon the particular cut which has been adopted. The most convenient amount of strain therefore must be determined by trial for any given sample and cut, but after a little experience with any given cut the user usually will be able to forecast the appropriate amount of strain without any real difficulty. An adequate working rule can, however, be formulated. In the case where the strain is imposed mechanically, a few test specimens having the crystallographic orientation in question are cut from the crystal and strained mechanically until they fracture. The crystals to be treated are then strained, during the process of thermal treatment in accordance with the invention, by an amount which is about 30% less than the strain required to produce fracture. If the reduction in twinning so produced is insufficient, the crystals may be treated again under a somewhat larger strain. It will also be appreciated that an unnecessarily large strain is undesirable, since there is a danger that crystals may fracture during the thermal treatment, and reasonable adjustments of the amount of strain may be made by trial so as to minimize the risk of breakage. In the case where the strain is produced by means of a temperature gradient in the crystal, a similar rule may in principle be applied: namely, that it is desirable that the gradient should be as large as possible without being large enough to produce fracture of the material.

The method of treatment in accordance with the invention may be carried out on slices of crystal which are not in the final form. Generally, it is convenient to use a slice having faces rectangular in shape, and if the crystal element in its final form is to have rectangular faces, it is convenient to reduce the element to its final shape before treatment, but somewhat oversize, since untwinning is often somewhat imperfect along the edges and the oversize element can then be trimmed to correct size and the imperfect material removed during trimming. If the final crystal is to be circular in shape, it nevertheless is convenient to treat a rectangular slice from which the circular element or elements will ultimately be cut.

The effect of the temperature gradient method of setting up a strain appears to be not completely to remove twinning, but rather to localize the twinning to definite parts of the crystal, which parts are characteristic of and vary with the cut of the crystal. In so doing the proportion of the volume of the crystal which is electrically twinned may be considerably reduced, and hence the improvement in accordance with this aspect of the invention obtained. In some cases, however, the electrically twinned proportion may actually be increased. This is the case when the crystal is originally free from electrical twinning, for the aforesaid characteristic patterns of electrical twinning are still obtained with such crystal. Of course, if the crystal is originally substantially free from electrical twinning, there is no need to apply to it the treatment in accordance with the invention unless it is desired deliberately to introduce the characteristic pattern of electrical twinning into the crystal. The latter may sometimes be the case, for some of the patterns correspond to possible modes of piezo-electric vibration of the crystals and the presence of such electrical twinning enables the crystals to be excited into vibration in these modes without the necessity of any special electrode arrangements.

In any case, whether the electrically twinned proportion is increased or decreased, the advantage may be obtained that by localization of the electrical twinning in the characteristic pattern it becomes possible thereafter to cut from the treated crystal in accordance with this pattern at least one smaller section of practically useful size which is substantially free from electrical twinning. Thus it may even be possible in some cases to make use without any waste at all of quartz which might otherwise have been completely useless.

Figs. 9a–9g of the drawings illustrate typical characteristic electrical twinning patterns which are obtained after the temperature strain method of treatment aforesaid, the electrically twinned parts remaining after treatment being indicated by shading and the nature of the different cuts indicated at the side of each figure. The figures show cross sections at right angles to the length of the crystal plates, the twinning being substantially the same for parallel cross sections throughout the length.

It will be appreciated that untwinned crystals of considerable and useful sizes may be cut from the treated crystals showing these patterns of twinning. Thus, for example, untwinned plates may be cut from the plates shown in Figs. 9a–9e, as indicated by the dotted lines, the plate of Fig. 9e, for example, yielding two smaller plates exhibiting opposite polarities during use. Again, the plates shown in Figs. 9f and 9g may be completely cut up into four and six untwinned plates respectively.

It will also be appreciated that the plate shown in Fig. 9f or 9g has a pattern of electrical twinning modified to obtain in the crystal a pattern of electrical twinning corresponding to a possible mode of piezoelectric vibration of the plate and may be used without further cutting in association with normal electrodes for exciting such a mode of vibration.

While the characteristic pattern is often obtained with one treatment of a plate in this way, it may sometimes be necessary, after completing one cycle of treatment, comprising heating followed by cooling while the crystal is strained by maintaining a temperature gradient therein, to repeat this cycle of treatment one or more times for the number of cycles necessary to provide in the crystal a substantially stable characteristic pattern. The term "stable" implies that further treatment does not appreciably alter the pattern of the electrical twinning.

As an example of carrying out the temperature gradient method of treatment in accordance with the invention, let it be required to treat a rectangular crystal element 50x12x5 mm. of X cut, corresponding to $\phi = 30°$, $\theta = 90°$, and $\psi = 0°$. The apparatus used conveniently consists of a rectangular bar or rod of iron 11x2.5x1.6 cm. having a hole 11x1.2x0.3 cm. running centrally along its entire length. A copper tube containing a thermocouple is attached to one end of the rod, and a length of 5 cm. at the other end of the rod is covered by a heating coil wound on thin mica wrapped around the rod. The coil is made of about 200 cm. of No. 26 S. W. G. resistance wire of nickel-chromium alloy, having a room-temperature resistance of about 12 ohms. Asbestos cord is wound around the outside of the wire. The crystal slice is placed centrally in the cavity in the rod and the whole is placed in a muffle furnace. A current of about 1.1 amperes is passed through the said heating coil, so as to raise the mean temperature of the rod about 100° C. above that of its surroundings and to establish a temperature gradient along its length of about 1.5° C./cm. The muffle furnace is then raised to such a temperature that the temperature registered by the thermocouple is about 660° C., the time taken to attain this temperature, starting from room temperature, being from three to four hours. The temperature rise during the first hour may be conveniently about 400° C.

The temperature of 660° C. is maintained for about ¼ hour, and the temperature of the muffle furnace is then steadily reduced to 400° C. during a period of about 3 hours. During this time the crystal is cooling through the neighborhood of the inversion temperature. A somewhat faster rate of cooling through this region may be used, but, particularly with parallelepipedal crystals not more than five millimeters thick, it is preferable that such cooling be at a rate of less than 150° C. per hour. After about 400° C. is reached the temperature may be allowed to drop more rapidly, so that the muffle furnace returns approximately to room temperature in a further time of about 1½ hours, the current passing through the said heating coil being switched off after about an hour of this cooling time has elapsed. Thus during most of the cooling period, the crystal is enclosed in the cavity so as to be in a metal container along which a temperature gradient is maintained to produce a corresponding appropriate temperature gradient in the crystal, causing the crystal to be strained.

As an example of carrying out the mechanical torque method of treatment in accordance with the invention, let it be required to treat a rectangular crystal element 5x1x0.1 cm. of BT cut, corresponding to $\phi=0°$, $\theta=140°$, and $\psi=0°$. A suitable apparatus for applying a mechanical couple to the plate to strain it during the heat treatment is shown in Fig. 10.

The apparatus consists of two pieces of U-section channel iron 43 and 44, fastened together on bars 45, 46 and parallel to one another at a distance apart somewhat greater than the length of the crystal plate 47 which is to be treated. A vertical slot 48, about a millimeter wider than the thickness of the plate 47, is cut in the inner side of channel 44, and in channel 43 opposite slot 48 two 120° V's are cut at 49 and 50.

An iron head 51 is provided with a knife edge which rides in the V's 49 and 50 after the fashion of a balance. The angle made by the sides of the knife edge is about 90°. A groove 52 is cut in the side of head 51 which faces the slot 48. The groove 52 is about 3 millimeters deep and a millimeter wider than the thickness of the plate 47. A hole 53 about 1 cm. in diameter is drilled in head 51, as shown.

The crystal plate 47, the ends packed in mica, not shown, is held in the slot 48 and the groove 52. The mica serves not only to distribute the pressure on the crystal 47, but also to avoid unduly large temperature gradients where it presses against the iron. It is important to see that the crystal plate is accurately aligned in order to minimize the risk of its breaking.

A constant torque may conveniently be applied to the crystal by inserting an iron rod, not shown, some 13 cm. long in the hole 53, the greater part of the rod being on one side of the head 51, so that most of the weight is applied to twist the crystal. When a greater torque is required, iron rings may be hung on the rod at any distance from the knife edges. For plates 5 x 1 x 0.1 cm. a torque of 170 gm. wt. cm. has normally been used, though for thicker plates this has been increased roughly in proportion to the square of the thickness of the plates.

This apparatus, holding the crystal and applying a constant torque to it, is put in a muffle furnace and the temperature raised to about 700° C., the time taken to reach this temperature being, as before, about four hours with an initial rise of some 400° C. per hour. The furnace is then allowed to cool down, the initial rate of cooling being about or rather less than 100° C. per hour.

It appears desirable, for the sake of completeness, to set out rather more fully the nature of the changes which the mechanical torque process in accordance with the invention is capable of producing. These changes are illustrated diagrammatically in Figs. 11a, 11b, 11c and 12a, 12b, and 12c for a rectangular plate cut parallel to an R face of the main crystal, and in Figs. 13a, 13b, 13c and 14a, 14b, and 14c for a plate cut parallel to an r face of the main crystal. In each case the long edges of the plate are parallel to an electric axis. Each of Figs. 11a, 11b, and 11c is a plan view of the plate, a twinned area being represented conveniently by a triangle. In Fig. 11a the triangular area is supposed to be electrically twinned with respect to the area enclosing it, while in Fig. 11b the triangular area is assumed to be optically twinned. In Fig. 11c the triangular area is supposed to be both electrically and optically twinned (compound optical twinning). The direction of the X-axis is indicated, as are also the signs of the charges produced in the several areas by compression along the X-axis. If the several plates are strained by a couple applied about the center line of each plate lying in the direction of the X-axis, and the thermal treatment above described is applied, the structures after the treatment are those shown in Figs. 12a, 12b, and 12c, respectively.

It will be seen in Fig. 12a that the main body 54 of the plate remains unaffected, remaining an R plane in the crystal; but the electrically twinned portion 55 has been converted from an r plane to an R plane having the same orientation as the remainder of the plate. The plate has thus become homogeneous, since both portions were assumed to be originally of the same optical activity and, as previously explained, the treatment does not alter the sense of the optical activity. It likewise will be seen from a comparison of Figs. 11b and 12b that, the optical activity being unaffected by the treatment and there having been no electrical twinning originally, there is no change as a result of the treatment. The process is, in fact, as earlier remarked, not applicable for the production of changes in crystals which are optically twinned but not electrically twinned. Finally, on comparing Figs. 11c and 12c, it will be seen that the electrical twinning has been removed but the optical twinning remains. The appropriate change in accordance with the invention has thus been produced, although, with the twinning defect illustrated in Fig. 11c, the change is likely to be of little or no interest from the commercial point of view. This, however, is of little importance in view of the rarity of compound optical twinning.

On the other hand, comparing Figs. 13a and 14a, showing plates before and after treatment respectively, it will be seen that before the treatment a plate cut parallel to an r face of the main crystal and suffering from electrical twinning only has the main body 56 of the plate changed from being an r plane to being an R plane, while the twinned portion 57, which is in this case an R plane initially, remains unchanged. In Figs. 13b and 14b it will be seen that both portions of the plate were initially r faces and both are converted to R faces by the treatment. However, the optical activities of the two portions remain unchanged, and the electrical behavior of the two portions in relation to one another remains unchanged. It will be observed that the directions of the electrical axes of both portions have been reversed. Nevertheless, it is still true that the process has produced no change in the state of electrical twinning, since the crystal was electrically free of twinning before, and remains free of electrical twinning after, the application of the treatment.

Finally, from Figs. 13c and 14c, it will be seen that the appropriate change has again been produced, electrical twinning having been removed but the optical twinning remaining unchanged. A change of this kind lacks interest from the commercial point of view just as does that illustrated with reference to Figs. 11c and 12c.

A further remark may be made regarding crystals treatable in accordance with the invention for which $\phi = 0°$ and which are originally so cut that for one part of the crystal $\theta = \theta'$, where $\theta'$ is greater than 0° and less than 90°. In an electrically twinned part of such a crystal $\theta$ is equal to $180° - \theta'$. After the treatment, the part, or a portion of the part, for which $\theta = \theta'$ will have been converted to $\theta = 180° - \theta'$. This information, with that given in connection with Figs. 11, 12, 13, and 14, will be sufficient to enable those skilled in the art to estimate the probable effect of the thermal treatment on most of the cuts generally employed in practice, and therefore will assist in making a decision as to how to cut any actual crystals which manifest twinning but which appear likely to be worth treating.

In Figs. 15a, 15b, and 15c and 16a, 16b, and 16c, cases are shown in which a rectangular plate is cut parallel to an r face of the crystal, the long edges of the plate being inclined at 45° to the electric axis contained in the respective r plane. Figs. 15a, 15b, and 15c illustrate the material before treatment, and Figs. 16a, 16b, and 16c, respectively, illustrate the material after treatment under a torque applied about an axis parallel to the long edges of the plate. In view of the explanations already given the nature of the changes will be evident from the drawing. On comparison of Figs. 15a and 16a with Figs. 13a and 14a, respectively, it will be seen that whereas the r face in Fig. 13a is converted by the treatment to an R face, the twin R region being unaffected, in Fig. 15a it is the twin R region which is converted to an r face, the original r face remaining unaffected. This is due to the difference in the angles between the torque axis and the electric axis in the two cases.

It will be appreciated from this that the relation between the direction of the axis about which torque is applied and the directions of the crystal axes has an important effect on the nature of the changes produced. For practical purposes, it should be noted that, if it is desired that the plate after treatment shall be of BT cut, the plate should initially be cut either as a BT plate or as a plate for which $\theta$ is the supplement of that finally required, $\psi$ being chosen in the neighborhood of 0° whichever initial cut is chosen. In cases where it is desired that the plate after treatment shall be of AT cut, the plate should initially be cut either as an AT plate, or as a plate for which $\theta$ is the supplement of that finally required, except that $\psi$ in this case should be chosen in the neighborhood of 45°, whichever initial cut is chosen. After the thermal treatment of the invention the treated plate may be subdivided into piezoelectric elements having faces exhibiting the desired value of the angle $\psi$.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. The method of treating a quartz crystal which manifests electrical twinning comprising, heating the crystal, and thereafter cooling said crystal while said crystal is strained to modify the pattern of said electrical twinning.

2. The method of treating a quartz crystal which manifests electrical twinning comprising, heating the crystal, and thereafter cooling said crystal while said crystal is strained to reduce the proportion of the volume of said crystal which is electrically twinned.

3. The method of treating a quartz crystal which manifests electrical twinning comprising, heating the crystal to a temperature appreciably above its alpha-beta inversion temperature to convert it to the beta form, and thereafter cooling said crystal through said inversion temperature while said crystal is strained to modify the pattern of said electrical twinning.

4. The method of treating a quartz crystal which manifests electrical twinning comprising, heating the crystal to a temperature appreciably above its alpha-beta inversion temperature to convert it to the beta form, and thereafter cooling said crystal through said inversion temperature while said crystal is strained to reduce the proportion of the volume of said crystal which is electrically twinned.

5. The method of treating a quartz crystal which maifests electrical twinning comprising, heating the crystal, and thereafter cooling said crystal, while said crystal is strained by maintaining a temperature gradient therein, to modify the pattern of said electrical twinning.

6. The method of treating a quartz crystal which maifests electrical twinning comprising, heating the crystal to a temperature appreciably above its alpha-beta inversion temperature to convert it to the beta form, and thereafter cooling said crystal through said inversion temperature, while said crystal is strained by maintaining a temperature gradient therein, to modify the pattern of said electrical twinning.

7. The method of treating a quartz crystal which manifests electrical twinning comprising, heating the crystal, and thereafter cooling said crystal, while said crystal is enclosed in a metal container along which a temperature gradient is maintained to produce a corresponding temperature gradient in said crystal causing said crystal to be strained, to modify the pattern of said electrical twinning.

8. The method of treating a quartz crystal which manifests electrical twinning comprising, heating the crystal to a temperature appreciably above its alpha-beta inversion temperature to convert it to the beta form, and thereafter cooling said crystal through the neighborhood of said inversion temperature at a rate of less than 150 degrees centigrade per hour, while said crystal is strained, to modify the pattern of said electrical twinning.

9. The method of treating a quartz crystal which manifests electrical twinning comprising, heating the crystal, and thereafter cooling said crystal, while said crystal is strained by direct application thereto of a mechanical stress, to modify the pattern of said electrical twinning.

10. The method of treating a quartz crystal which manifests electrical twinning comprising, heating the crystal, and thereafter cooling said crystal, while said crystal is strained by direct application thereto of a mechanical torsional couple, to modify the pattern of said electrical twinning.

11. The method of treating a quartz crystal having a longitudinal direction therealong and manifesting electrical twinning comprising, heating the crystal, and thereafter cooling said crystal, while said crystal is strained by direct application thereto of a mechanical torque applied in a plane perpendicular to said longitudinal direction of said crystal, to modify the pattern of said electrical twinning.

12. The method of treating a quartz crystal which manifests electrical twinning comprising, heating the crystal, and thereafter cooling said crystal, while said crystal is strained by maintaining a temperature gradient therein, to complete one cycle of treatment modifying the pattern of said electrical twinning, and repeating said cycle of heating followed by cooling while said crystal is strained for the number of cycles necessary to provide in said crystal a substantially stable characteristic pattern of electrical twinning.

13. The method of treating a quartz crystal which manifests electrical twinning comprising, heating the crystal, thereafter cooling said crystal while said crystal is strained to modify the pattern of said electrical twinning, and thereafter cutting from said crystal at least one section substantially free from electrical twinning.

NORA ANNA WOOSTER.
WILLIAM ALFRED WOOSTER.
EDWARD ARMITAGE FIELDING.

REFERENCES CITED

The following references are of record in the file of this patent:

The Properties of Silica, by Sosman, chapter XII, pages 192–196.

Secondary Dauphine Twinning in Quartz, by Clifford Trondel, from The American Mineralogist, vol. 30, May–June 1945, pages 447–460 inclusive.